United States Patent [19]
Griffiths

[11] 3,887,273
[45] June 3, 1975

[54] SPEEDOMETER OPTICAL PROJECTION SYSTEM

[75] Inventor: David Griffiths, North Plainfield, N.J.

[73] Assignee: Conrad J. Friedemann, Bloomfield Hills, Mich.

[22] Filed: July 27, 1973

[21] Appl. No.: 383,244

[52] U.S. Cl. .................. 353/14; 353/98; 353/69
[51] Int. Cl. ................. G03b 21/00; G03b 21/28
[58] Field of Search ............ 353/13, 14, 69, 11, 98

[56] References Cited
UNITED STATES PATENTS

| | | | |
|---|---|---|---|
| 1,753,222 | 4/1930 | Timoney | 353/69 |
| 2,568,943 | 9/1951 | Blaisse | 353/69 |
| 2,935,729 | 5/1960 | Henss | 353/14 |
| 3,715,721 | 2/1973 | Irving | 353/13 |

*Primary Examiner*—Richard E. Aegerter
*Assistant Examiner*—A. J. Mirabito
*Attorney, Agent, or Firm*—Harness, Dickey & Pierce

[57] ABSTRACT

A system for projecting a speedometer or other instrument reading as a virtual image, focused at infinity, into the field of view of a vehicle operator includes the windshield and a lens system containing a lens that substantially corrects aberrations caused by curvature of the windshield.

6 Claims, 3 Drawing Figures

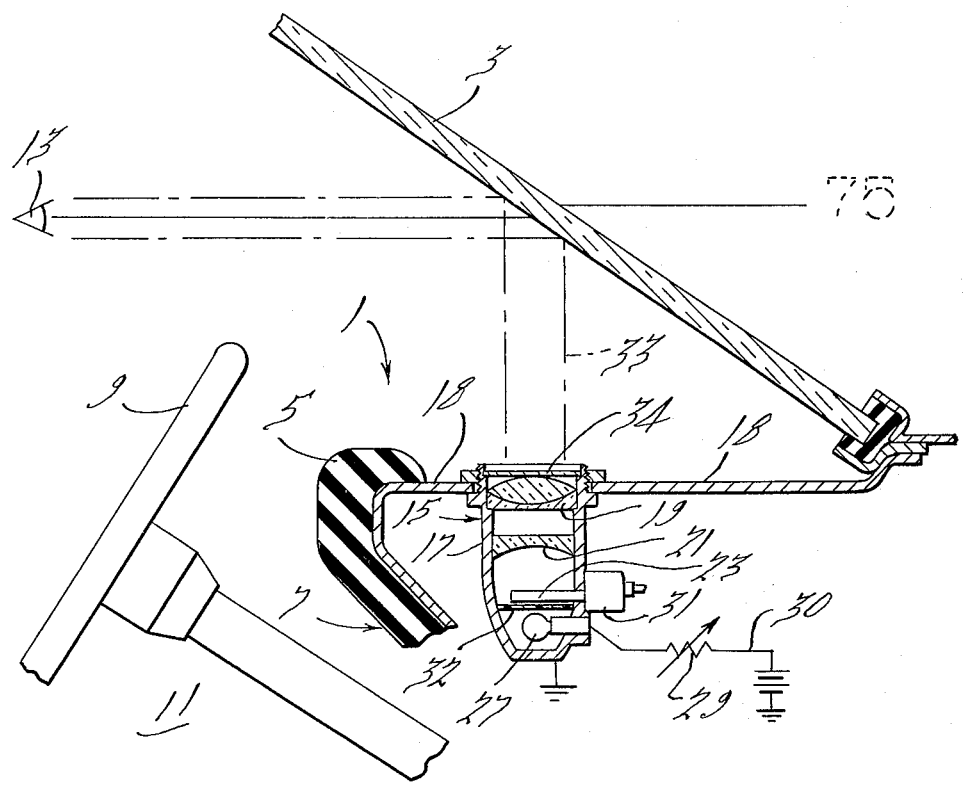
Fig. 1.
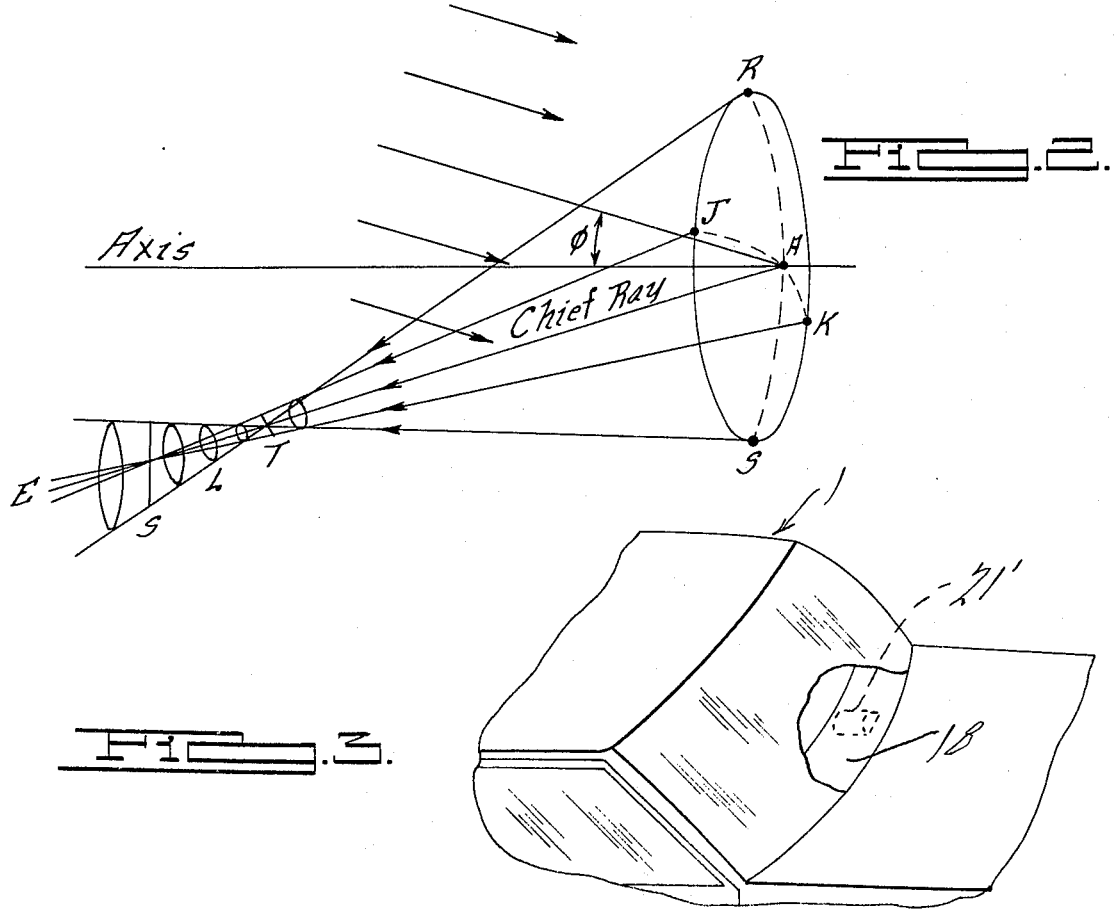
Fig. 2.
Fig. 3.

3,887,273

SPEEDOMETER OPTICAL PROJECTION SYSTEM

BACKGROUND OF THE INVENTION

It has long been recognized that it would be desirable to eliminate the need for a vehicle operator to take his eyes off the external scene when he wants to read the information presented by the instruments in the driver's compartment. As a consequence, all vehicle manufacturers have exerted substantial effort to place the instrument dials in positions that involve minimum distraction and offer the best viewing advantage to the operator. Additionally, systems for actually projecting readings by means of optical systems into the operator's field of view have been proposed, some of these, at least, being described in French Pat. No. 1,243,086 and U.S. Pat. Nos. 1,871,877; 2,264,044; 2,382,631; 2,579,806; 2,641,160; 2,685,818; 2,737,845; and 2,738,491.

Most of the known optical systems include a special viewing screen which is located in or close to the operator's normal field of vision. Such a screen is itself a distraction and reduces the driver's concentration on what is happening outside the vehicle. Other systems have used the windshield as a part of an optical system but if such systems are used in modern vehicles the image will be distorted and unacceptable.

BRIEF SUMMARY OF THE INVENTION

The present invention involves (1) the discovery that windshield curvature is a distorting factor in optical projection systems for vehicle instruments and (2) a means for overcoming the image distortion caused by the windshield when it is used as a part of the projection system.

The invention provides the operator of a vehicle the means for observing his speedometer reading, or other selected instrument readings indicating conditions of his vehicle, without having to remove his gaze from the driving scene or to refocus his visual system. The invention provides means whereby the readings are projected optically as a virtual image focused at infinity and positioned ahead of the driver. The driver thus can easily read the instruments without refocusing or redirecting his vision as he concentrates on the normal driving scene. The instrument readings appear at the periphery of the driver's visual field.

The invention features an optical projection system corrected for aberrations induced by the vehicle windshield. The optical system comprises a spherical projection lens, an aberration correcting cylindrical lens, and the vehicle windshield. The cylindrical lens can be either of a positive or negative focal length. The lens system is preferably positioned below the vehicle instrument panel along with the reticle to be projected. The reticle may be a mask in the form of a dial containing numerals indicating speedometer readings (or other instrument readings as appropriate) and is rotated or moved in the same manner as conventional speedometer arrangements. Light from a bulb illuminates the reticle, the light being transmitted through the numerals and projected through the optical system. The light source is rheostatically controlled so the proper intensity of the projected image can be supplied for varying driving environments.

DESCRIPTION OF THE DRAWINGS

FIG. 1 is a schematic sectional view through a portion of an automobile having a speedometer optical projection system embodying the invention and using a cylindrical lens of negative focal length;

FIG. 2 shows a distorted image of an off-axis object point at infinity as formed by a concave spherical mirror; and FIG. 3 is a schematic view showing orientation of a cylindrical lens of positive focal length to correct for the aberrations caused by windshield curvature.

DESCRIPTION OF THE INVENTION

The automobile 1 has a windshield 3 which in a modern vehicle is generally not planar but is formed with simple and often compound curvature. Despite the curvature, the windsheild can be approximately described as being in a plane at an angle with respect to the plane of the crash pad cowl 5 which is associated with the engine instrument panel 7 and shelf 18, these being located forwardly of the steering wheel 9 of the driver compartment 11.

The driver is positioned behind the steering wheel 9 and his eye 13 is usually focused through the windshield at objects located near infinity. Normally to determine the vehicle speed and other conditions of the vehicle, the driver must look down at the instrument cluster 7, focus at the close distance, locate the proper dial, note the reading, and then redirect and focus his eyes to the objects before the vehicle. During the redirecting and refocusing operations, the driver is subject to inconvenience and compromising his attention on road conditions. It is the purpose of this invention to project the instrument reading as a luminous image in space, formed within the normal field of view of the driver and focused at infinity. With the use of this invention, the driver can continuously perceive and read the condition indicators of his vehicle as his vision is directed ahead and focused on the normal driving scene. The system 15 includes the housing 17 which is mounted inside the automobile beneath the windshield shelf 18. The housing has a section to suit the component parts, such as rectangular or circular with an adapter lens mounting. The image observed by the driver is a virtual image projected by the optical system. (Note: The projection of an imaginary speedometer reading of 75 miles per hour is rotated 90° in FIG. 1 to facilitate understanding the drawing.) The optical system includes the lens 19 and 21 and the windshield 3. The latter performs the function of a mirror to the projection system. The lens system consists of a spherical projection lens 19 and an optical element 21 to correct for aberrations in the optical system induced by the windshield curvature. Together with the windshield, the lens system produces parallel or collimated light 33 to the driver's visual system. For this reason, the projected image appears to focus at infinity.

The reticle 23 is within housing 17 and illuminated by an incandescent lamp 27. The lamp and thus the brightness of the projected image can be adjusted by the rheostat 29 in a suitable electrical circuit 30 so the image is acceptable under all ambient conditions. The reticle consists of a dial or scale from the speedometer (or other instrument gauge). It is preferable for the numbers and letters on the projected dial to be bright while the background is dark. To achieve this, the reticle preferably has transparent alphanumeric information on an opaque background. The reticle is driven in the conventional manner as pertains to the instrument being projected; e.g., a conventional speedometer drive 31 connected to the automobile drivetrain. To obtain uniform illumination of the reticle, the light is dispersed using a diffusing screen 32 between the light source and the reticle. A transparent dust cover 34 is preferably used over the top of the housing 17.

If the windshield is planar, the optical projection system may consist of only a spherical projection lens, preferably an achromatic lens to correct for chromatic aberration. The lens is placed so its back focal plane lies in the plane of the reticle. The windshield plays the role of both a planar mirror to the projection system and a window to the driving environment. The lens projection housing 17 may be mounted so parallel light rays pass through an opening in the shelf 18 and reflect from the windshield 3 into the driver's eyes. However, in practice, the windshield surface is not planar but contains compound curvature. The curvature of the windshield affects the light rays reflected from it causing a shift in the virtual image position along with aberrations in the image. These aberrations cause the image to be blurred and distorted. It is the purpose of the invention to provide a means to correct this condition.

Considering the windshield as possessing spherical curvature the situation is fundamentally described in FIG. 2. Image aberration occurs when a spherical mirror is used to image an object lying some distance from the mirror axis. The result is that each object point is imaged into two mutually perpendicular line images instead of a point. The object in FIG. 2 is a point at infinity and the incident rays are parallel at an angle $\phi$ with respect to the mirror axis. The reflected rays are converging toward two lines S and T. The reflected rays in the vertical or tangential plane RAS are focused at line T while the rays in the horizontal or sagittal plane JAK focus to line S. The separation between the tangential and sagittal foci is related to the angle $\phi$ between the chief ray and the mirror axis. As the obliquity of the rays decreases and the chief ray approaches the axis, the separation between S and T approaches zero and the lines shorten in length.

The speedometer projection system light rays are incident upon the windshield in the same manner as described in FIG. 2. The horizontal plane JAK of the windshield is across the width of the vehicle. The vehicle direction is approximately along the chief ray AE. The effect of the windshield curvature is thus related to the effect of off-axis use of a spherical mirror described in FIG. 2; i.e., the image becomes astigmatic. Also the curvature causes a distinct focus shift. The focus shift can be corrected by altering the position of the spherical projection lens 19. Since most windshield surfaces are concave to the interior of the vehicle, the projected image is moved closer than infinity by the windshield curvature. The proper correction for this shift is to move the projection lens 19 slightly toward the reticle (i.e., at less than the focal length of the lens) until the projected image moves back to infinity.

The windshield curvature also produces two perpendicular line images (each focusing at a different plane) from each point on the object as described for FIG. 2. The resultant best focus image appears blurred to the driver. The proper correcting element for this image is a cylindrical lens. Thus, a cylindrical lens is placed in the projection optical system 15, preferably between the light source 27 and the spherical lens 19 for convenience. It shifts the focus plane of one of the line images while not affecting the other. The resultant image again appears sharply focused to the driver.

FIG. 1 shows the use of a negative focal length cylindrical lens 21 for a compensating element. The negative lens is placed with its power (curvature) along the length of the vehicle. The lens shifts the tangential focus farther from the driver to coincide with the sagittal focus.

FIG. 3 shows the use of a positive focal length cylindrical lens 21' in the projection system. The cylindrical lens is placed with its power positioned across the width of the vehicle. The lens shifts the sagittal focus closer to the driver to coincide with the tangential focus. Each lens 21 and 21' is actually a segment of a cylindrical surface as illustrated, the negative being concave and the positive convex with the opposite face flat.

Although the windshield surface is not perfectly spherical the compensation offered by the cylindrical lens 21 or 21' corrects for the major part of the image aberrations and the projected image is of good quality. As shown in FIG. 1, the luminous, vertical, projected image appears to hang in space and to be at infinite focus. It is always in focus to the driver's eyes as he navigates his vehicle. The projected image is preferably positioned slightly off the center of the driver's field of view, either to one side or below, so it will not be distracting.

While the invention is illustrated in conjunction with speedometer readings, it can be used in conjunction with other instrument readings of concern to the vehicle operator. As the driver surveys the road ahead, whether he concentrates on relatively near or far objects, the speed (and other conditions of his vehicle) is relayed to him via an illuminated display that hangs in space just a short distance from the center of his forward vision. Since the image is projected at infinity, it will always be within the depth of field of the driver's eyes while he gazes at objects ahead.

I claim:

1. In a vehicle with an instrument panel including a speedometer or the like having a movable scale with indicia providing vehicle condition information for the vehicle operator, a system for projecting said information as a luminous image at infinite focus substantially in the operator's forward field of view comprising a transparent windshield concave to the interior of the vehicle and of substantially spherical curvature, a projection lens for projecting parallel light rays on the inside surface of said transparent windshield, a light source for illuminating said scale and located on the opposite side of the scale from the lens, and an optical correcting element in the system for sharply focusing said image to overcome aberration produced by the curvature of the windshield, said scale being positioned at less than the focal length of the projection lens to correct for focus shift produced by curvature of the windshield.

2. The invention as set forth in claim 1 wherein said correcting element is a cylindrical lens.

3. The invention as set forth in claim 2 wherein said cylindrical lens is negative and positioned so that its curvature is along the length of the vehicle.

4. The invention as set forth in claim 2 wherein said cylindrical lens is positive and positioned so that its curvature is across the width of the vehicle.

5. In a vehicle with an instrument panel including a speedometer or the like having a movable scale with indicia providing vehicle condition information for the vehicle operator, a system for projecting said information as a luminous image at infinite focus substantially in the operator's forward field of view comprising a transparent windshield concave to the interior of the vehicle and of substantially spherical curvature, a projection lens for projecting parallel light rays on the inside surface of said transparent windshield, a light source for illuminating said scale and located on the opposite side of the scale from the lens, and an optical correcting element in the system for sharply focusing said image to overcome aberration produced by the curvature of the windshield, said correcting element being a negative cylindrical lens positioned so that its curvature is along the length of the vehicle.

6. In a vehicle with an instrument panel including a speedometer or the like having a movable scale with indicia providing vehicle condition information for the vehicle operator, a system for projecting said information as a luminous image at infinite focus substantially in the operator's forward field of view comprising a transparent windshield concave to the interior of the vehicle and of substantially spherical curvature, a projection lens for projecting parallel light rays on the inside surface of said transparent windshield, a light source for illuminating said scale and located on the opposite side of the scale from the lens, and an optical correcting element in the system for sharply focusing said image to overcome aberration produced by the curvature of the windshield, said correcting lens being a positive cylindrical lens positioned so that its curvature is across the width of the vehicle.

* * * * *